United States Patent [19]

Hofer

[11] 4,403,469
[45] Sep. 13, 1983

[54] COMBINE TOOTH AND MOUNTING THEREFOR

[76] Inventor: Walter D. Hofer, 926-7 A St. S., Lethbridge, Alberta, Canada

[21] Appl. No.: 365,282

[22] Filed: Apr. 5, 1982

[51] Int. Cl.³ .......................................... A01D 77/08
[52] U.S. Cl. .................................................. 56/400
[58] Field of Search ................. 56/400, 364, 400.21

[56] References Cited

U.S. PATENT DOCUMENTS 3,253,395  5/1966  Johnston et al. ..................... 56/400
3,904,026  9/1975  Hofer ................................... 56/400

FOREIGN PATENT DOCUMENTS 1089656  11/1980  Canada ................................ 56/400

Primary Examiner—Jay N. Eskovitz
Attorney, Agent, or Firm—Colton & Stone, Inc.

[57] ABSTRACT

A combine tooth is attached to a combine belt by means of a bolt having an enlarged, substantially planar head. The base portion of the tooth has a recess carrying a friction plate. The belt is tightly clamped between the bolt head and the friction plate.

5 Claims, 5 Drawing Figures

COMBINE TOOTH AND MOUNTING THEREFOR

The present invention relates to a combine tooth and to the mounting of such tooth to a combine belt.

BACKGROUND OF THE INVENTION

In combines of the type in which the pick-up tines or teeth are carried in spaced rows on an endless belt, provision must be made for securely mounting the teeth to the belt and for the removal and replacement of a tooth when necessary due to breakage or wear. Examples of combine tooth mountings are found in my U.S. Pat. Nos. 3,206,920; 3,904,026; and 3,935,697.

It is a primary object of the invention to provide an improved combine tooth and mounting therefor which facilitates the replacement of an individual tooth.

It is also an object of the invention to provide an improved combine tooth and mounting therefor which assures accurate positioning and alignment of the teeth.

BRIEF SUMMARY OF THE INVENTION

The above and other objects of the invention which will become apparent hereinafter are achieved by the provision of a combine tooth and mounting in which the tooth includes a base portion having a through bore the lower end of which is of square cross-sectional configuration and which has a transversely extending recess on its lower portion, a friction plate receiveable in the recess and having a square opening, a bolt having an enlarged substantially planar head, a first shank portion of square cross-sectional configuration for engaging the friction plate and lower portion of the bore of the tooth base portion and a further threaded shank portion projecting through the upper portion of the bore, and a nut threadable on the further shank portion. When the tooth is mounted on the combine belt, the belt is tightly clamped between the bolt head and the friction plate.

For a more complete understanding of the invention and the objects and advantages thereof reference should be had to the following detailed description and accompanying drawing wherein a preferred embodiment of the invention is described and illustrated.

DETAILED DESCRIPTION OF THE PREFERRED EMBODIMENTS

Figure 1:
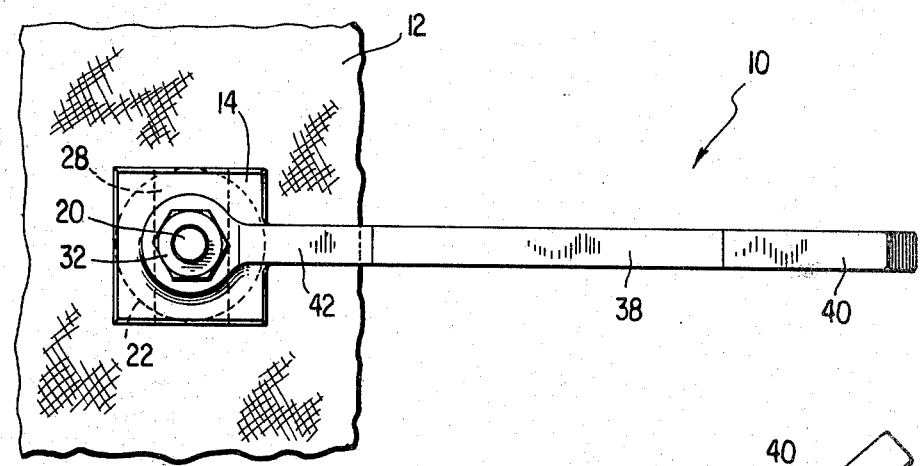
FIG. 1 is a top plan view of the combine tooth of my invention mounted on a combine belt.

The combine tooth of the present invention, designated generally by the reference numeral 10, is mounted on a combine belt 12. The tooth includes a base portion 14 having a through bore 16 and, on the bottom surface, a transversely extending recess 18.

Figure 2:
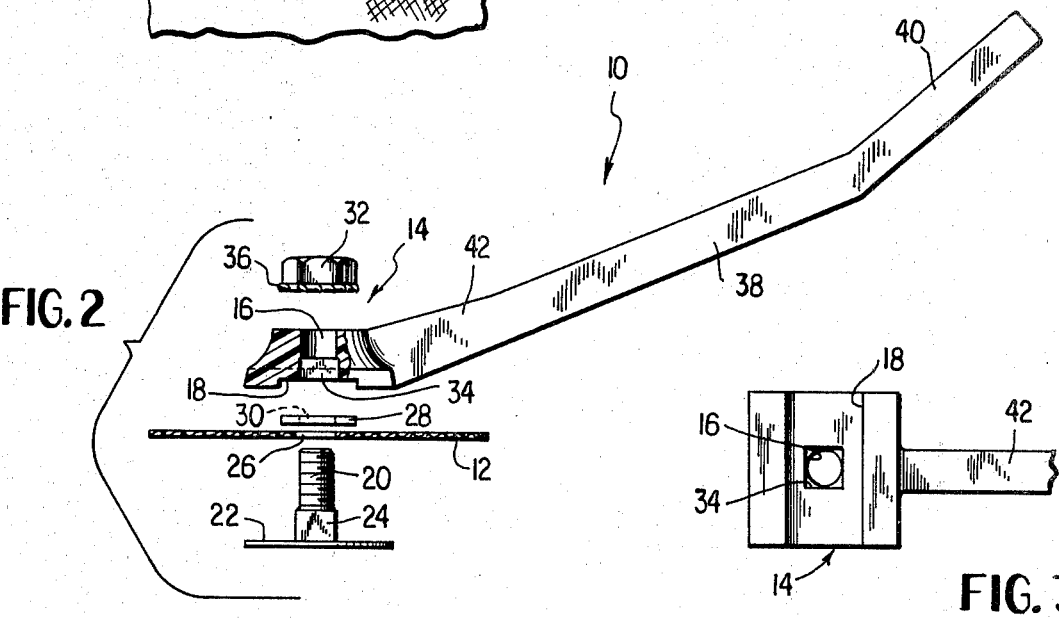
FIG. 2 is an exploded side elevational view, partially in section, thereof.
Figure 3:
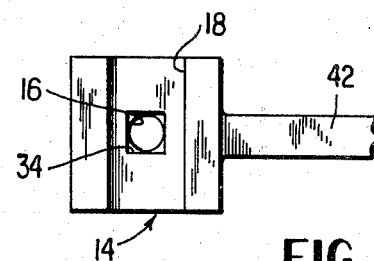
FIG. 3 is a fragmentary bottom plan view of the combine tooth.

As can be seen most clearly from FIG. 2, the tooth 10 is affixed to the combine belt 12 by means of a bolt 20 having an enlarged, flat head 22, the shank portion 24 of the bolt adjacent the head being of square cross-sectional configuration. The bolt 20 projects upwardly through a hole 26 in the belt 12 and receives a friction plate 28 ahving a square hole 30 engaging the shank portion 24 of the bolt. The width of the plate 28 is nearly equal to the width of the recess 18 and the length and thickness thereof are, preferably, equal to the length and depth, respectively, of the recess. The threaded portion of the bolt extends through the bore 16 of the base portion 14 of the tooth 10 for reception of a nut 32. The lower portion 34 of the bore 16 may be of square cross-sectional configuration to receive the bolt shank portion 24. Also, a lock washer 36 may be provided and, preferably, is captivated on the nut 32.

Mounting of the tooth 10 to the combine belt 12 involves inserting the bolt 20 to project through the hole 26 of the belt, positioning the friction plate 28 and base portion 14 of the tooth on the bolt and threading of the nut 32 onto the bolt. Tightening of the nut results in the belt 12 being firmly clamped between the bolt head 22 and the friction plate 28, the belt-engaging face of the plate preferably being roughened to increase the resistance to turning of the tooth assembly. It will be appreciated that during tightening of the nut, the tine portion of the tooth serves as a convenient lever to oppose the torque of the wrench.

The tine portion of the tooth includes a first section 38 extending from the base portion 14 at an angle of approximately 24° from the plane of the lower surface of the base portion and a second section 40 angled upwardly by approximately an additional 11°. The section 40 is of square cross-section as is the outer part of the section 38, the inner part 42 thereof being of increased height providing a smooth transition to the upper face of the base portion 14.

Figure 4:
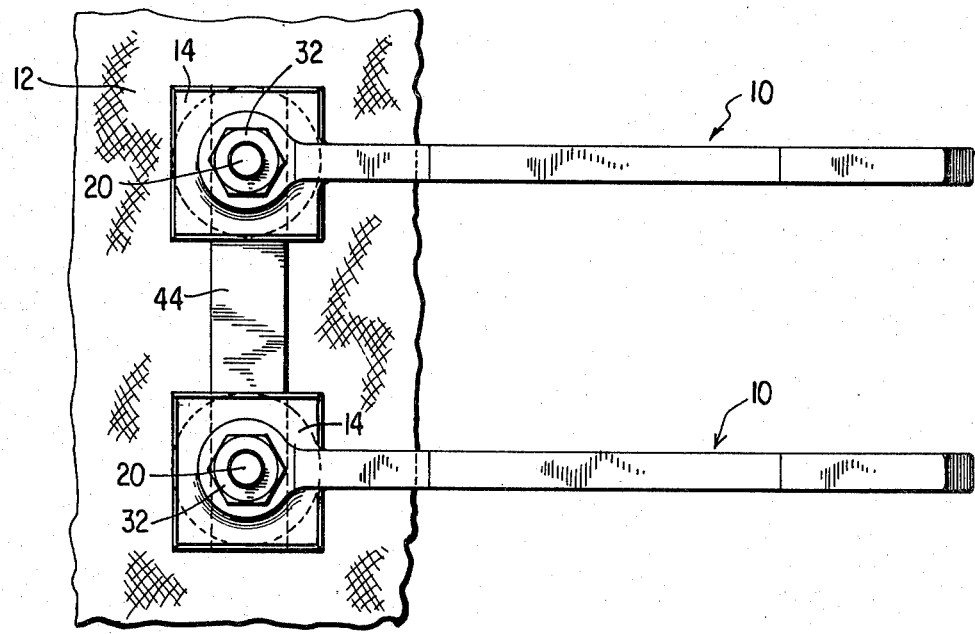
FIG. 4 is a top plan view showing a modified mounting arrangement for the combine tooth.

Referring now to FIG. 4 where a modification of the invention is illustrated, it will be seen that, in place of the friction plate 28, an elongated strap 44 may be employed. This strap is configured so as to be received in the recesses 18 of adjacent teeth 10, the strap having square holes for receiving the shank portions 24 of the corresponding bolts 20. It will be understood that, while the strap 44 is shown connecting two teeth, the length of the strap may be of any desired length to mount any desired number of teeth.

Figure 5:
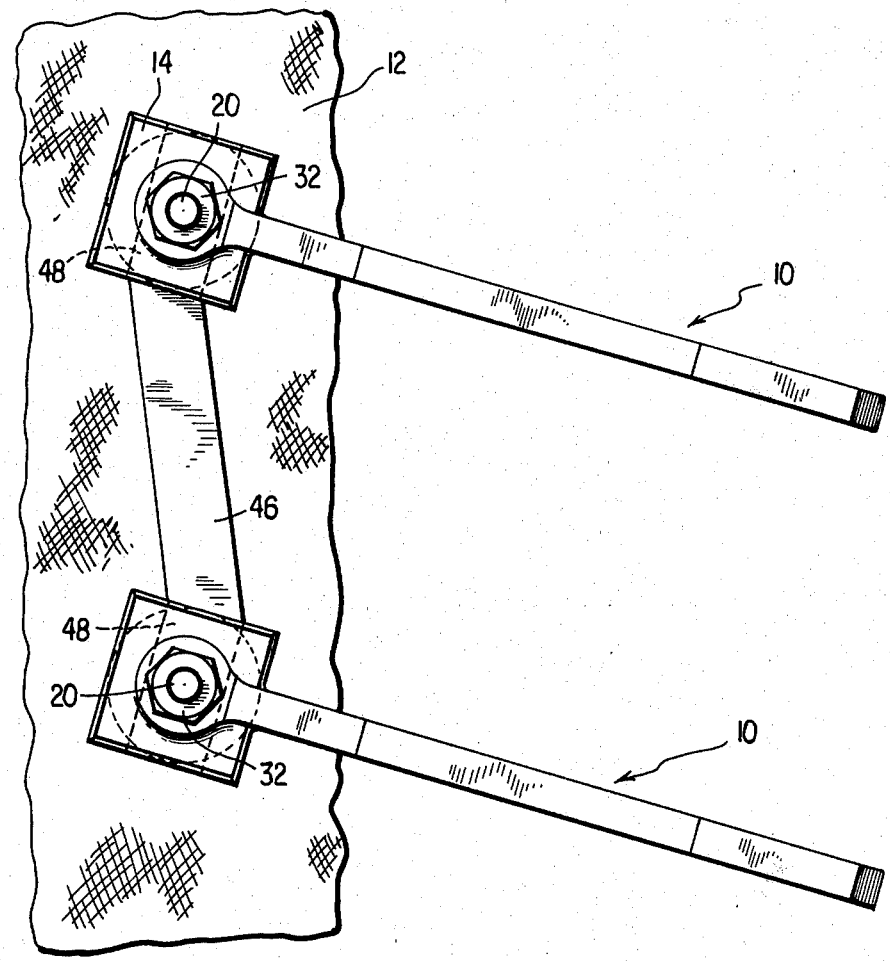
FIG. 5 is a top plan view showing a further modification of the combine tooth mounting arrangement.

While in the embodiments shown in FIG. 4, the teeth 10 are aligned with the direction of movement of the combine belt, it is, at times, preferrable to angle the teeth, particularly when short grains or straw swaths are to be picked up. FIG. 5 illustrates a strap 46 modified for this purpose. The modified strap 46 includes portions 48 angled relative to the central portion thereof and receivable in the recesses 18 of teeth 10. The strap 46 may be inverted to angle the teeth in the opposite direction from that shown in FIG. 5.

The tooth 10 is preferably of single piece molded plastic. A suitable material is Zytel S.T. 801 Nylon (a product of E. I. Dupont de Nemours and Company).

While preferred embodiments of the invention has been illustrated and described, it will be understood that the invention is not limited thereto. Reference should, accordingly, be had to the appended claims in determining the true scope of the invention.

I claim:

1. A combine tooth and mounting adapted for use on a combine belt comprising:
   a tooth having a base portion and a tine portion, said base portion having a through bore extending from the bottom to the top thereof, at least the lower portion of said bore being of square cross-sectional configuration, the bottom face of said base portion having a transversely extending recess, said tine portion projecting at an angle from one side of said base portion;

a friction plate of a length such as to extend between adjacent teeth positions on said combine belt and including, at each tooth position, a portion the configuration of which is complementary to that of said recess, said plate having a square hole at each tooth position;

a bolt having an enlarged, substantially planar head, a first shank portion of square cross-sectional configuration and a further threaded shank portion; and a nut threadable onto said further shank portion; the arrangement being such that, when said combine tooth is mounted on said combine belt, the shank portions of said bolt extend through said belt, said friction plate, said tooth base portion and said nut, in sequence, said belt being clampingly engaged between said bolt head and said friction plate.

2. The combine tooth and mounting of claim 1 further characterized in that said tine portion includes a first section projecting from said base portion at an acute angle and a section projecting from said first portion at a further acute angle.

3. The combine tooth and mounting of claim 2 further characterized in that said first mentioned acute angle is approximately 24° and said further acute angle is approximately 11°.

4. The combine tooth and mounting of claim 2 or 3 further characterized in that said first and second sections are of square cross-sectional configuration.

5. The combine tooth and mounting of claim 1 further characterized in that the portions of said friction plate received within the recesses of said adjacent teeth are angled relative to the intermediate portion thereof.

* * * * *